US009104525B2

(12) United States Patent
Dang et al.

(10) Patent No.: US 9,104,525 B2
(45) Date of Patent: Aug. 11, 2015

(54) API USAGE PATTERN MINING

(71) Applicant: Microsoft Corporation, Redmond, WA (US)

(72) Inventors: Yingnong Dang, Beijing (CN); Jue Wang, Beijing (CN); Kai Chen, Beijing (CN); Hongyu Zhang, Beijing (CN); Tao Xie, Cary, NC (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 13/746,622

(22) Filed: Jan. 22, 2013

(65) Prior Publication Data

US 2014/0208296 A1    Jul. 24, 2014

(51) Int. Cl.
G06F 9/44    (2006.01)
(52) U.S. Cl.
CPC .. G06F 8/77 (2013.01); G06F 8/75 (2013.01); G06F 8/751 (2013.01)
(58) Field of Classification Search
USPC ........................................................ 717/123
See application file for complete search history.

(56) References Cited

U.S. PATENT DOCUMENTS

| 7,430,732 | B2 | 9/2008 | Cwalina et al. |
| 7,945,591 | B2 | 5/2011 | Kumar et al. |
| 8,191,045 | B2 | 5/2012 | Sankaranarayanan et al. |
| 2006/0168566 | A1 | 7/2006 | Grimaldi |
| 2007/0288935 | A1* | 12/2007 | Tannenbaum et al. ........ 719/319 |
| 2011/0029475 | A1* | 2/2011 | Gionis et al. ................... 706/52 |
| 2011/0295892 | A1* | 12/2011 | Evans et al. .................. 707/776 |

OTHER PUBLICATIONS

Srivastava et al., Web Usage Mining: Discovery and Applications of Usage patterns from Web Data, Jan. 2000, Sigkdd Explorations, vol. 1, pp. 12-23.*
PCT Search Report and Written Opinion mailed Apr. 16, 2014 for PCT Application No. PCT/US2014/011750.
Wang, et al., "Mining Succinct and High-Coverage API Usage Patters from Source Code", Mining Software Repositories, IEEE Press, May 18, 2013, pp. 319-328.
Xie, et al., "MAPO: Mining API Usages from Open Source Repositories", Proceedings of the 2006 International Workshop on Mining Software Repositories, May 28, 2006, New York, NY, pp. 54-57.
Acharya, et al., "Mining API Patterns as Partial Orders from Source Code: From Usage Scenarios to Specifications", In Proceedings of 6th Joint Meeting of the European Software Engineering Conference and the ACM SIGSOFT Symposium on The Foundations of Software Engineering, Sep. 3, 2007, 10 pages.

(Continued)

Primary Examiner — John Chavis
(74) Attorney, Agent, or Firm — Gregg R. Wisdom; Judy Yee; Micky Minhas

(57) ABSTRACT

Techniques for mining API method usage patterns from source code are described. These techniques include parsing the source code to generate API method call sequences that include an API method. These call sequences are clustered to obtain clusters. Based on the clusters, frequent closed sequences are determined and then clustered to obtain an API usage pattern. In addition, optimal clustering parameters may also be determined. In some instances, a graphical representation is generated based on the API usage pattern in response to a query associated with the API method.

20 Claims, 10 Drawing Sheets

(56) References Cited

OTHER PUBLICATIONS

Ammons, et al., "Mining Specifications" In Proceedings of the 29th ACM SIGPLAN-SIGACT Symposium on Principles of Programming Languages, Jan. 16, 2002, 13 pages.
Ayres, et al., "Sequential Pattern Mining using a Bitmap Representation" In Proceedings of the Eighth ACM SIGKDD International Conference on Knowledge Discovery and Data Mining, Jul. 23, 2002, 7 pages.
Buse, et al., "Synthesizing API Usage Examples", In Proceedings of 34th International Conference on Software Engineering, Jun. 2, 2012, 11 pages.
Chatterjee, et al., "SNIFF: A Search Engine for Java Using Free-Form Queries" In Proceedings of 12th International Conference on Fundamental Approaches to Software Engineering, Mar. 22, 2009, 16 pages.
Cheng, et al., "Identifying Bug Signatures Using Discriminative Graph Mining" In Proceedings of ACM SIGSOFT International Symposium on Software Testing and Analysis, Jul. 19, 2009, 11 pages.
Eisenberg, et al., "Using Association Metrics to Help Users Navigate API Documentation", In Proceedings of IEEE Symposium on Visual Languages and Human-Centric Computing, Sep. 21, 2010, 8 pages.
Lo, et al., "Classification of Software Behaviors for Failure Detection: A Discriminative Pattern Mining Approach" In Proceedings of the 15th ACM SIGKDD International Conference on Knowledge Discovery and Data Mining, Jun. 28, 2009, 9 pages.
Lo, et al., "Efficient Mining of Iterative Patterns for Software Specification Discovery" In Proceedings of the 13th ACM SIGKDD International Conference on Knowledge Discovery and Data Mining, Aug. 12, 2007, 10 pages.
Lo, et al., "Efficient Mining of Recurrent Rules from a Sequence Database" In Proceedings of the 13th International Conference on Database Systems for Advanced Applications, Mar. 19, 2008, 17 pages.
Mandelin, et al., "Jungloid Mining: Helping to Navigate the API Jungle", In Proceedings of the ACM SIGPLAN Conference on Programming Language Design and Implementation, Jun. 12, 2005, 14 pages.
McMillan, et al., "Portfolio: Finding Relevant Functions and Their Usages" In Proceedings of the 33rd International Conference on Software Engineering, May 21, 2011, 10 pages.
Nguyen, et al., "Graph-based Mining of Multiple Object Usage Patterns", In Proceedings of 7th Joint Meeting of the European Software Engineering Conference and the ACM SIGSOFT Symposium on The Foundations of Software Engineering, Aug. 24, 2009, 10 pages.
Thummalapenta, et al., "PARSEWeb: A Programmer Assistant for Reusing Open Source Code on the Web" In Proceedings of the Twenty-second IEEE/ACM International Conference on Automated Software Engineering, Nov. 4, 2007, 10 pages.
Uddin, et al., "Temporal Analysis of API Usage Concepts", In Proceedings of 34th International Conference Software Engineering, Jun. 2, 2012, 11 pages.
Wang, et al., "An Empirical Study on the Characteristics of API Usage Patterns", Microsoft Research Asia, Published on: Aug. 17, 2012, Available at: http://research.microsoft.com/en-us/projects/up-miner/supportingmaterials_up-miner_paper.pdf, 8 pgs.
Wang, et al., "BIDE: Efficient Mining of Frequent Closed Sequences" In Proceedings of the 20th International Conference on Data Engineering, Mar. 30, 2004, 12 pages.
Xie, et al., "Improving Software Reliability and Productivity via Mining Program Source Code", In Proceedings of IEEE International Symposium on Parallel and Distributed Processing, Apr. 14, 2008, 5 pages.
Zhong, et al., "MAPO: Mining and Recommending API Usage Patterns" In Proceedings of the 23rd European Conference on Object-Oriented Programming, Jul. 6, 2009, 26 pages.
International Preliminary Examining Authority and Preliminary Report on Patentability for PCT Application No. PCT/US2014/011750, mailed Apr. 7, 2015, 14 pages.

\* cited by examiner

700 ⤸

```
1  Inputs:
2  CFS: Set of frequent closed sequences. Each of them has one support and a
   sequence of method calls.
3  Outputs:
4  Graph
5  Method:
6  Let method_call_set = {m|m ∈ all distinctive method calls in CFS}
7  Let probability_matrix
   = {p|p ∈ probabilities of method call b follows method call a ∨ p ∈
   probabilities of none of method calls follows method call a , a, b ∈
   method_call_set}
8  For every closed_seq in CFS
9     Add an end method call "End" to closed_seq
10    For every adjacent_method_calls a and b in closed_seq
11       probability_matrix[a][b]+= closed_seq_support
12    EndFor
13 EndFor
14 For every a in method_call_set
15    total count = 0
16    For every b in method_call_set
17       total count+= probability_matrix[a][b]
18    For every b in method_call_set
19       If (probability_matrix[a][b] does not equal 0)
20          probability_matrix[a][b] = probability_matrix[a][b]/
   total_count
21          Add edge ab with probability_matrix[a][b] to graph
22       EndIf
23    EndFor
24 EndFor
25 Output: graph
```
— 702

```
1.  Inputs:
2.    a_min and a_max : Minimum and Maximum threshold value for pre-BIDE clustering
3.    b_min and b_max : Minimum and Maximum threshold value for post-BIDE clustering
4.    S: search step of threshold
5.    U: utility function, which returns a value to measure the quality of mined patterns
      for a given threshold value for both pre-BIDE clustering and post-BIDE clustering
6.  Outputs:
7.    m_a, m_b: Optimal threshold value for pre-BIDE and post-BIDE clustering
8.  Method:
9.    set the initial pre-BIDE clustering threshold a to a_max
10.   set max =0, m_a =0, m_b =0
11.   For each a
12.       If a is greater than a_min
13.           set the initial post-BIDE clustering threshold b to b_max
14.       EndIf
15.       For each b
16.           If b is greater than b_min
17.               compute the utility function U
18.               If U is greater than max
19.                   max =U, m_a = a , m_b = b
20.               EndIf
21.           EndIf
22.           decrease b by S
23.       EndFor
24.       decrease a by S
25.   EndFor
26.   return m_a, m_b
```

API USAGE PATTERN MINING

BACKGROUND

To improve software productivity, programmers often reuse previous software or software knowledge to build new software. The application programming Interface (API) method is an important form of software reuse, and API reuse has been widely used in practice. For example, to construct new software systems, the programmers may resume existing software libraries or framework (e.g., .NET of MICROSOFT® and Java Development Kit of SUN®) by invoking API methods included in the software libraries. However, these API methods are often complex, and usage of these API method are not well documented. Although some techniques have been developed to identify API usage from the software libraries, these existing techniques lack metrics to measure the quality of API usage. In addition, results generated by the existing techniques are highly redundant, therefore posing significant barriers to be adopted in practice.

SUMMARY

Described herein are techniques for mining API usage patterns from source code. The techniques may parse the source code to generate API call sequences that include an API method. The API call sequences may then be clustered to generate multiple clusters. Based on the multiple clusters, frequent closed sequences may be determined using a frequent closed sequence mining algorithm and then clustered to generate an API usage pattern of the API method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 7 illustrates an example algorithm for generating a graphical representation of an API usage pattern.

FIG. 8 illustrates an example algorithm for determining optimal threshold values.

DETAILED DESCRIPTION

Overview

This disclosure is directed, in part, to mining API usage patterns from a codebase. Embodiments of the present disclosure may mine succinct and high-covering API usage patterns from the codebase, and present the API usage patterns in probabilistic graphs.

In accordance with the embodiments, a code file associated with the codebase may be parsed to generate API call sequences that include an API method. The API call sequences may be clustered to obtain first multiple clusters based on similarities among these call sequences. Based on the first multiple clusters, frequent closed sequences may be determined and further clustered to generate second multiple clusters corresponding to API usage patterns. As used herein, the term "a frequent closed sequence" means that a sequence is determined as a frequent closed sequence if the sequence is frequent and there are no proper super-sequences of the sequence that have the same support as the sequence. In addition, the support of a sequence may be a number of sequences in a sequence set that are a super sequence of the sequence. For example, a call sequence is determined as a frequent closed sequence if the support of the call sequence is not less than a predetermined minimum support threshold, and there are no other call sequences that are super-sequences of the call sequence and have the same support as the call sequence.

After generation of the second multiple clusters, an API usage pattern of the obtained API usage patterns may be determined and illustrated using a graphical representation in response to a query associated with the API method.

Existing techniques for API usage mining include Mining API usage Pattern from Open source repositories (MAPO). MAPO mines API usage patterns from open source code. However, results mined by MAPO are redundant and sometimes inaccurate. But embodiments of the present disclosure include determination of frequent closed sequences associated with API methods and a two-step clustering strategy before and after mining the frequent closed sequences from source code. These embodiments effectively reduce redundancy and improve succinctness and accuracy of the mined API usage patterns.

Illustrative Architecture

Figure 1:
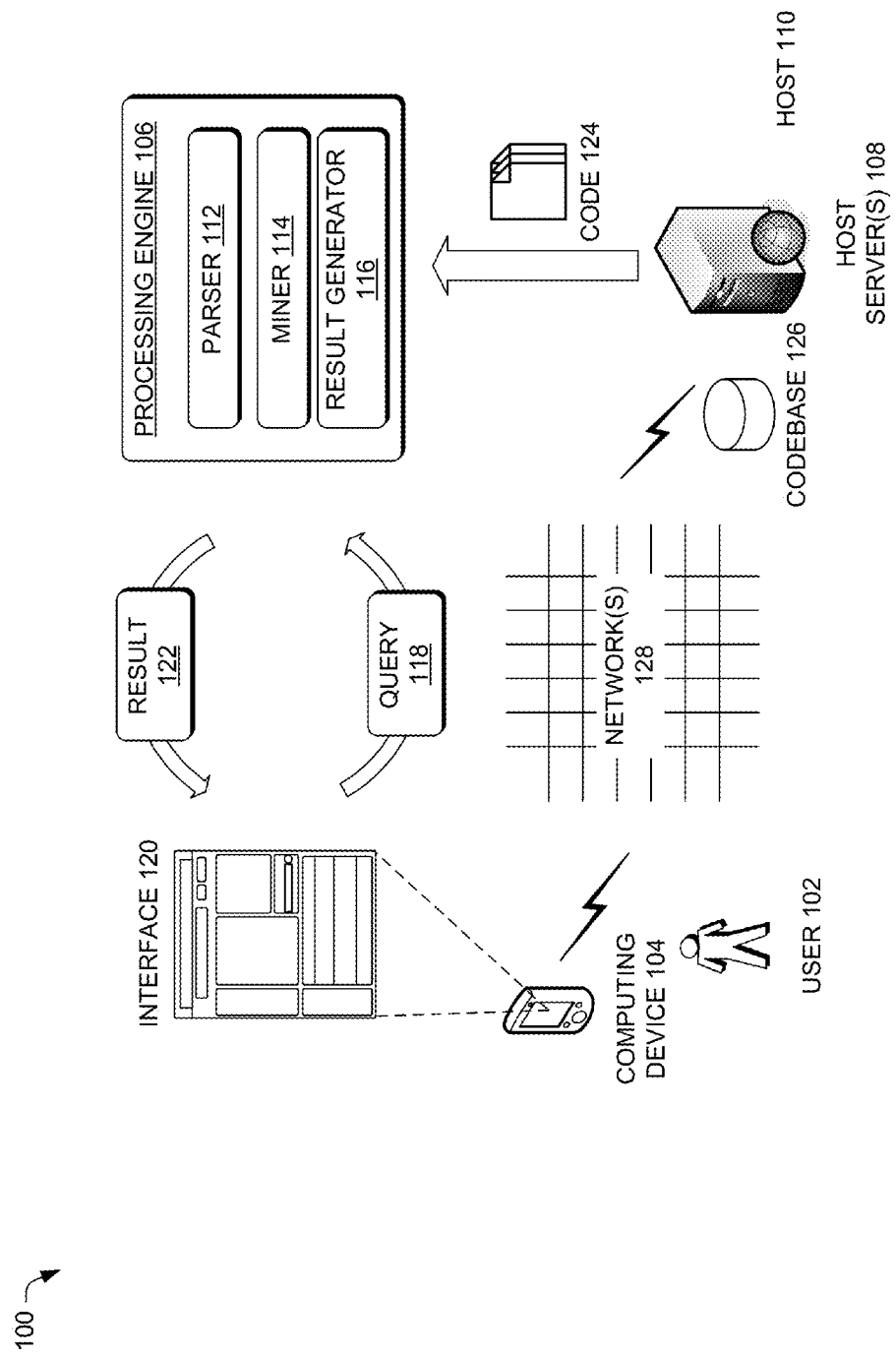
FIG. 1 illustrates an example architecture that includes a processing engine for mining API usage patterns.

FIG. 1 illustrates an example architecture 100 in which API usage patterns are generated. A user 102 submits a query to a server for API usage of an API method. The server may perform a search based on the API method and return a graphical representation that indicates a usage pattern of the API method and sample code snippets associated with the usage pattern. To obtain API usage patterns, the server may collect, from method bodies or a code file (e.g., a source file of a codebase), a set of call sequences with the API method to be queried in each call sequence. Each call sequence may contain a usage pattern of the API method to be queried. The server may then mine the set of call sequences to generate the API usage patterns, which may be used to generate a graphical representation corresponding to an individual usage pattern.

In the illustrated embodiment, the techniques are described in the context of the user 102 operating a computing device 104 to interact with a processing engine 106. The processing engine 106 may be implemented by the computing device 104 or a host server 108 of a host 110. The processing engine 106 may include a parser 112, a miner 114, and a result generator 116, which are discussed in greater detail below, in the discussion of FIG. 2.

In the architecture 100, the processing engine 106 acquires a query 118 through an interface 120 that is operating on the computing device 104. The query 118 may be associated with an API method. The processing engine 106 performs a search based on an API usage pattern and returns a result 122 (e.g., graphical data) to the interface 120. The interface 120 may surface an API search result on the computing device 104. The API search result includes a graphical representation indicating the usage of the API method and sample code associated with the graphical representation.

To generate the API usage pattern, the processing engine 106 acquires code 124 (e.g., a source code file) from the codebase 126. The codebase is stored and/or maintained on the host server 108, and includes collections of source code for particular applications or component (e.g., .NET of MICROSOFT® and Java Development Kit of SUN®, or other). The source code may be available at any existing codebase and include external source code (e.g., open source and forums database) and/or internal source code (e.g., enterprise codebase and a user defined codebase for his/her working project).

In the architecture 100, The computing device 104 may be a mobile telephone, a smart phone, a tablet computer, a laptop computer, a network, a personal digital assistance (PDA), a gaming device, a media player, or any other mobile computing device that includes a display, and can interface with a user via a user interface and connect to one or more networks 128 to exchange information with the host server 108 or another server providing an API search and/or API usage pattern mining.

The network(s) 128 may include wired and/or wireless networks that enable communications between the various computing devices described in the architecture 100. In some embodiments, the network(s) 128 may include local area networks (LANs), wide area networks (WAN), mobile telephone networks (MTNs), and other types of networks, possibly used in conjunction with one another, to facilitate communication between the various computing devices (i.e., the computing device 104 and/or the host server 108). The computing devices are described in greater detail with reference to the following figures.

Illustrative Scheme

Figure 2:
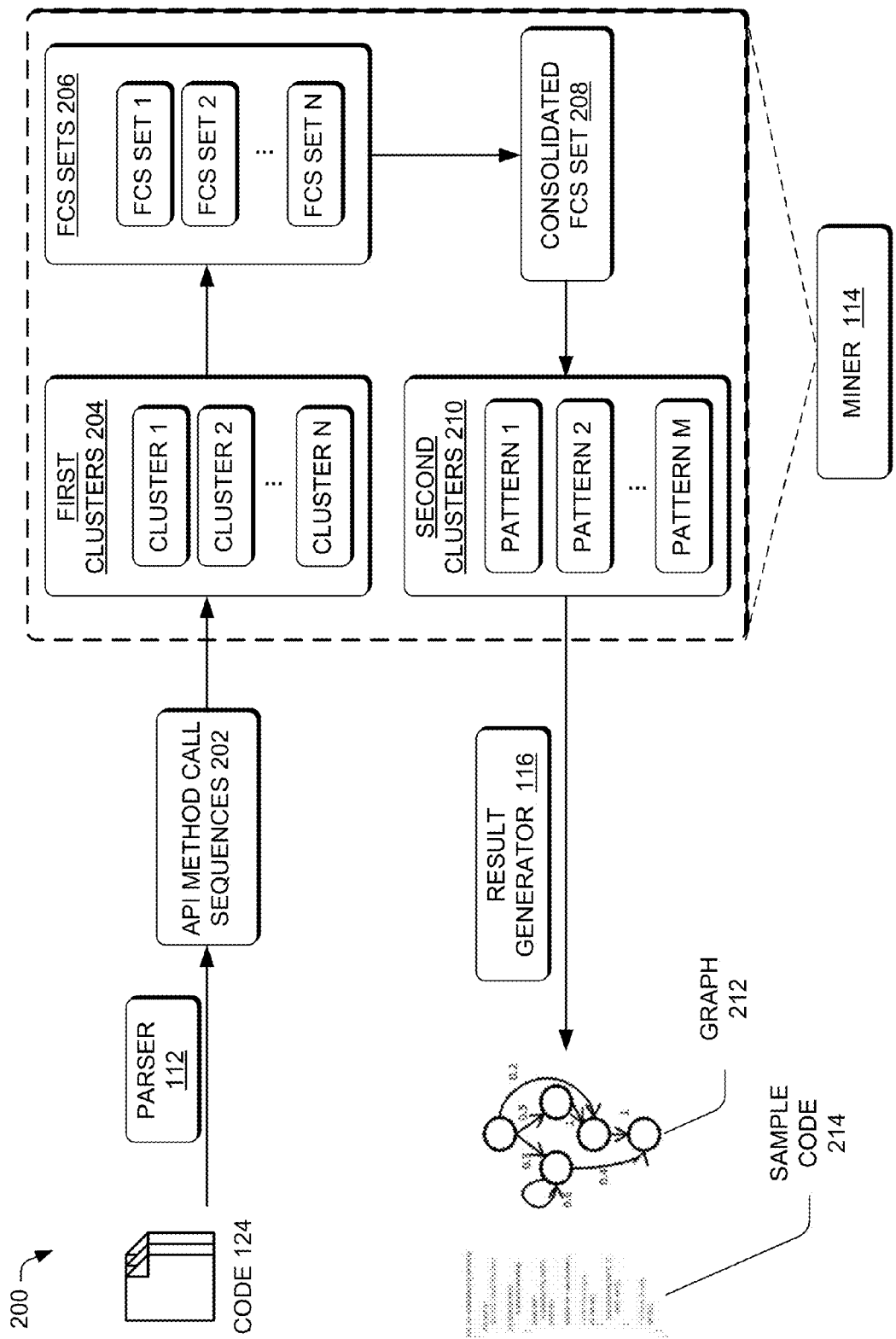
FIG. 2 illustrates an example scheme for mining API usage patterns.

FIG. 2 illustrates an example scheme 200 for mining API usage patterns. In the scheme 200, the code 124 (e.g., a C# file) may be parsed to identify and/or collect a set of calls to API methods. In some embodiments, the parser 112 may parse the code 124 to identify API method calls and match the object type to each API method call. In these instances, the parser may first identify instances of calling the API methods.

In some embodiments, the parser may identify the object types of the instances and match the object types to the API method calls. For example, the parser 112 may use a parsing tool (e.g., MICROSOFT® Roslyn or other parsing tool) to construct Abstract Syntax Tree (AST) for the code 124. In some embodiments, the parser 112 creates the index for individual API methods. In these instances, an API method may be indexed to include a complete file path, class, method attributes (e.g., return value, method name, parameter list, startLine, endLine, and so on), API name, and line number of the API.

In some embodiments, the parser 112 may also filter out some common logging and assertion API methods (e.g., log-.Info and Assert. AreEqual), which may be irrelevant to the program logic. In these instances, the irrelevant API methods may be filtered out based on a predetermined blacklist that includes the irrelevant API methods.

After identifying API methods and/or indexing API methods, the parser 112 may collect the set of API method calls and then generate corresponding API method call sequences 202. Based on the API method call sequences 202, the miner 114 may generate API usage pattern, the mining process is indicated by a dash box in FIG. 2.

The miner 114 may cluster the API method call sequences 202 to generate first clusters 204 including multiple clusters (e.g., cluster 1, cluster 2 . . . cluster N). In some embodiments, the first clusters 204 may be generated using a probability algorithm (e.g, an n-gram model).

After being generated, the first clusters 204 may be mined to identify the frequent API usages using a frequent closed sequence mining algorithm (e.g., BI-Directional-Extension-based frequent closed sequence mining (BIDE)). For example, the BIDE algorithm may be applied to each cluster of the first clusters 204 to generate frequent closed sequences. Here, the BIDE algorithm may build projected datasets and find frequent API method call sequences. The processing engine 106 may determine whether these frequent API method call sequences are closed using bi-directional extension. Using the BIDE algorithm, the miner 114 may generate frequent closed sequence (FCS) sets 206 for individual clusters of the first clusters 204. The FCS sets 206 may include multiple FCS sets (e.g., FCS set 1, FCS set 2 . . . FCS set N) corresponding to the multiple clusters included in the first clusters 204.

After being generated, the FCS sets 206 may be merged to obtain a consolidated FCS set 208 of API methods. The consolidated FCS set 208 may be clustered to generate second clusters 210 that include multiple clusters. Each cluster of these multiple clusters may indicate an API usage pattern for an API method. The API method may have one or more API usage patterns (e.g., pattern 1, pattern 2, . . . and/or pattern M) corresponding to one or more clusters derived from the consolidated FCS set 208.

After the API usage patterns are generated, the result generator 116 may generate graphical representations. The graphical representations (e.g., a graph 212) and a sample code 214 may be then acquired by the interface 120 and surfaced on the computing device 104. In some embodiments, a graph (e.g., the graph 212) may denote an API usage pattern. A node of the graph may indicate an API method and an edge indicates a temporal relationship between two methods. Each edge is associated with a probability value that indicates the probability of calling a first method right after calling a second method among all occurrences of this usage pattern in the code 124. The graph and the generation of the graph are discussed in a greater detail in FIGS. 6 and 7.

Illustrative Operations

Figure 3:
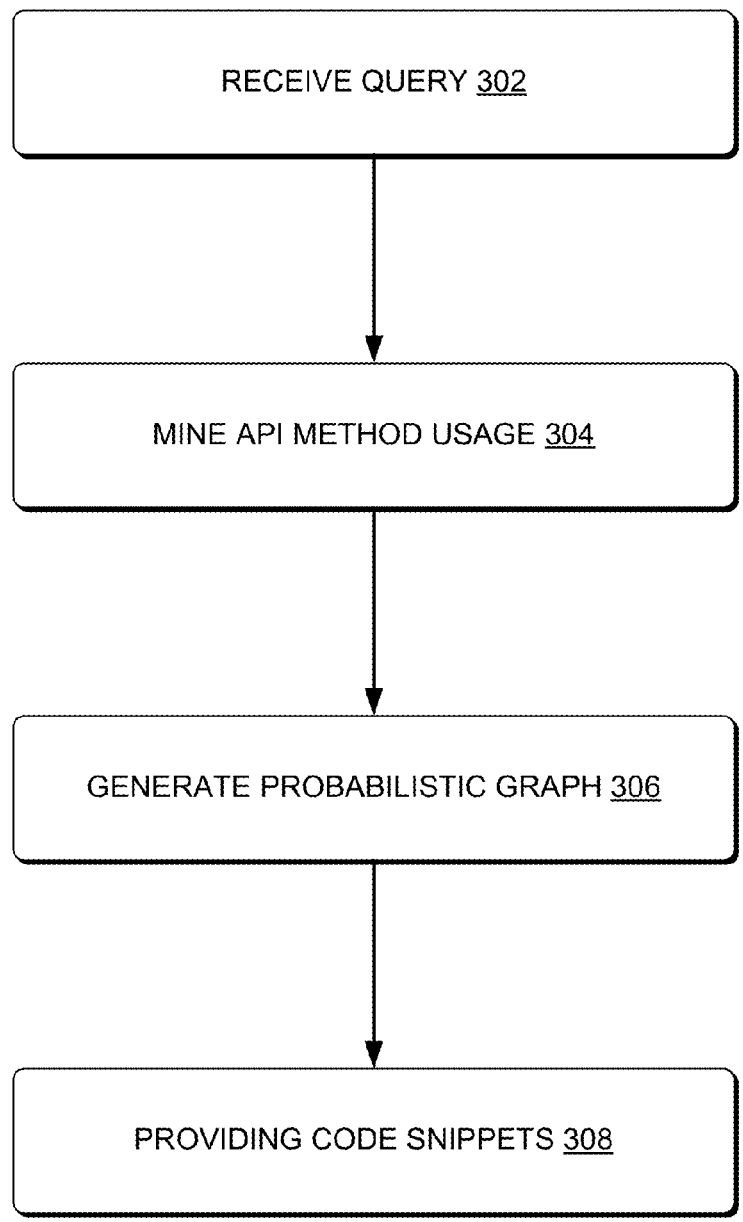
FIGS. 3-5 illustrate example processes for mining API usage patterns.

FIG. 3 illustrates an example process 300 for API method searches using mined API usage patterns. The process 300 and other processes described throughout this disclosure, including the processes 400 and 500, are illustrated as collections of blocks in logical flow graphs, which represent sequences of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 302, the host server 108 may receive the query 118 for an API usage pattern of an API method. In some embodiments, the user 102 may request the API usage pattern and submit the request through the interface 120. Then, the processing engine 106 may formulate the query 118 and submit the query 118 to a web service hosted by the host server 108.

At 304, the processing engine 106 may mine API method usages to generate one or more API usage patterns for the API methods. In some embodiments, the processing engine 106 may collect a set of call sequences (i.e., API method call sequences) that includes the API method, and then perform clustering on the set of call sequences to generate multiple clusters based on the similarity of the sequences. The processing engine 106 may then mine API usage patterns from each cluster of the multiple clusters using a frequent closed sequence mining algorithm (e.g., BIDE), and perform clustering again to group the frequent closed sequences into API usage patterns. In these instances, the processing engine 106 may identify one or more API usage patterns corresponding to the API method associated with the query 118.

At 306, the processing engine 106 may generate a probabilistic graph to visualize the identified API usage patterns. At 308, the processing engine may also identify code snippets for the API method that are associated with the identified API usage patterns. In some embodiments, the processing engine 106 may transmit the API usage patterns and the code snippets as the result 122 to the interface 120, which then surfaces and presents the API usage patterns and the code snippets to the user 102 on the computing device 104.

Figure 4:
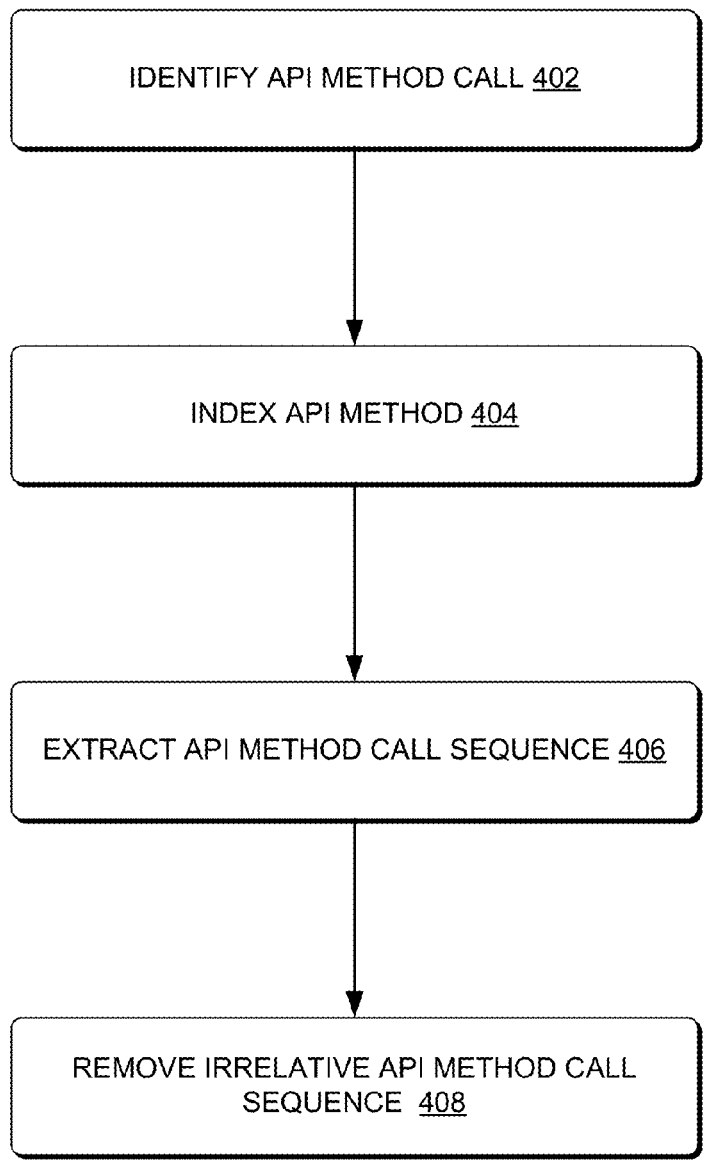

FIG. 4 illustrates an example process 400 for collecting API method call sequences. At 402, the processing engine 106 may identify a set of API method calls by parsing the code 124. For example, suppose that the code 124 includes a C# file. The parser 112 may parse the C# file to identify API method calls included in the C# file instances. The parser 112 may also match an object type to each API method call.

At 404, the processing engine 106 may index individual API methods identified based on the code 124. In some embodiments, the parser 112 may create index files for individual API methods included in the code 124. In some embodiments, the parser 112 may output the results based on an order of files and/or an order of API methods. The parser 112 may index the APIs with complete file path, class, method attributes (e.g., return value, method name, parameter list, startLine, endLine, and so on), API name, and line number of API.

At 406, the processing engine 106 may extract a set of API method call sequences (e.g., the API method call sequences 202) from method bodies or source files of a codebase. Each API method call sequence may contain a usage pattern of the API method. At 408, the processing engine 106 may remove irrelative API methods from the collected method sequences. In some embodiments, the irrelative API methods may be removed based on a predetermined blacklist, which includes one or more context-irrelative API methods. In these instances, the relative API methods may be associated with certain contexts or tasks that the user 102 may desire to achieve.

In some embodiments, the relative API methods may be found in source code files at a frequency that is higher than a predetermined value. In these instances, the corresponding source code snippets may be associated with certain contexts or tasks that the user 102 may desire to achieve. An API method may be irrelative regarding a source code file but relative regarding another source code file.

Figure 5:
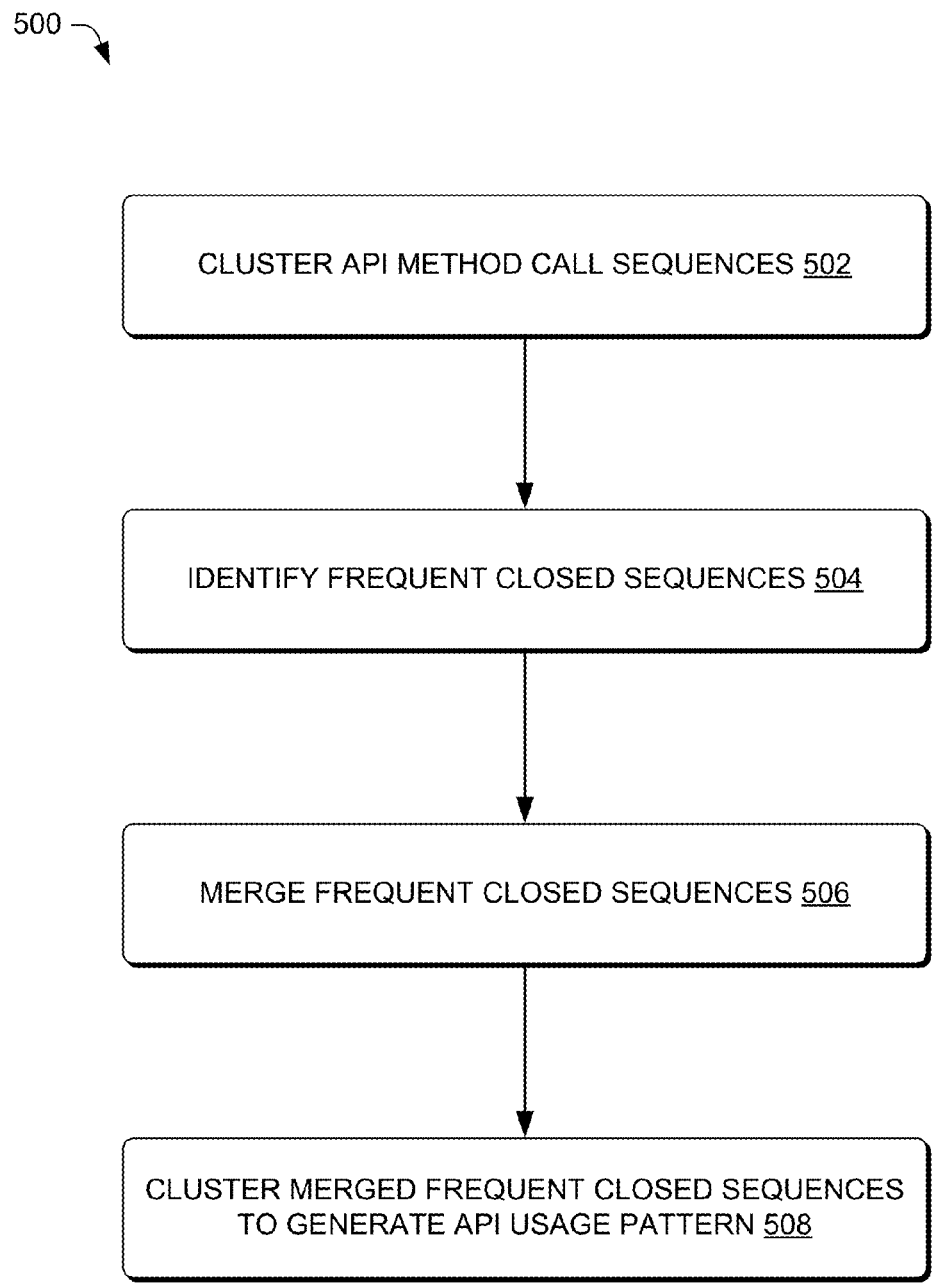

FIG. 5 illustrates an example process 500 for mining API usage patterns. The parser 112 may extract, from the code 124, multiple sets of call sequences associated with multiple API methods. Individual call sequences in one set of call sequences contain a specific API method, the usage patterns of which will be mined from the set of call sequences by the process 500. The miner 114 may perform a first clustering based on the similarity of the call sequences in one call sequence set. The miner 114 may then apply a frequent closed sequence mining algorithm (e.g., BIDE) to the clustered call sequences. The minder 114 may then perform a second clustering to group the frequent closed sequences into multiple clusters that indicate API usage patterns of the API method.

In the illustrated embodiments, at 502, the miner 114 may cluster a set of API method call sequences (e.g., the API method call sequences 202) that are extracted from the code 124 and associated with an API method. The API method call sequences 202 may be clustered to generate the first clusters 204 including multiple clusters.

The first clustering may be performed to avoid the problem of imbalanced usage distribution. For example, for some very common API usages, the associated sequences may be frequent and gain a large support. However, for some less common API usages, the associated frequency may be low and thus may not reach a minimum support threshold. Clustering the API method call sequences before mining frequent patterns may increase a probability that less frequent patterns are mined out. In these instances, the less frequent patterns may satisfy only a minimum support within a group of the API method call sequences 202 (i.e., a cluster of the first clusters 204) instead of the API method call sequences 202.

In some embodiments, the miner 114 may cluster the API method call sequences 202 using an n-gram based technique (e.g., a sequence-similarity-based method (SeqSim)) to compute the similarity of any two sequences. The definition of n-gram for a sequence X ($x_1$ $x_2$ ... $x_n$) is as follows:

$$n\text{-gram}(X) = \{x_1, x_2, \ldots, x_n, x_1x_2, x_2x_3, \ldots, x_{n-1}x_n, \ldots, x_1x_2 \ldots x_{n-1}x_2x_3 \ldots x_{n-1}x_nx_1x_2 \ldots x_{n-1}x_n\}$$

Also, two method sequences are more similar if they share longer common subsequences. Thus, the longer a common subsequence is, the higher is the weight associated with the common subsequence. Then, the similarity of any two call sequences s1 and s2 is calculated using equation (1) as follows.

$$SeqSim(s1, s2) = \frac{\text{Weight}(n\text{-gram}(s1) \cap n\text{-gram}(s2))}{\text{Weight}(n\text{-gram}(s1) \cup n\text{-gram}(s2))} \quad (1)$$

Suppose that s1=abc and s2=acb, and the weight of ab (a bi-gram) is 2. The weight of ab appears in the denominator since s2 does not contain it, and the weight of a (a uni-gram) is 1. As a result, the similarity between these two sequences can be computed as 0.176.

Based on the SeqSim values, the API method call sequences 202 may be clustered with a threshold a, which is discussed in a greater detail in Illustrative Determination of the Optimal Coefficients below. In some embodiments, a complete linkage clustering technique may be applied to the first clustering. In these instances, every pair of call sequences in a cluster may be less that the threshold a. In addition, a distance between two clusters may be computed as the maximum distance between a pair of objects in two clusters. In some embodiments, the distance between two clusters may be computed as the maximum distance among partial or all pairs of objects in two clusters.

At 504, the miner 114 may identify the frequent closed sequences for individual clusters of the first clusters 204. The miner 114 may generate the FCS sets 206 including multiple frequent closed sequence sets. In some embodiments, the miner 114 may apply a frequent closed sequence mining algorithm (e.g., BIDE) to identify frequent closed sequences.

For example, given a minimum support threshold min_sup, a sequence S may be a frequent sequence if the support of S sup (S)≥min_sup. Here, the support sup (S) is the ratio of the occurrences of S to the total number of sequences. If sequence $S_a$ is contained in sequence $S_b$, $S_a$ is called a subsequence of $S_b$ and $S_b$ a supersequence of $S_a$. Thus, S may be determined to be a frequent closed sequence if sequence S is frequent and there exists no proper super-sequence of S with the same support. Similarly, a call sequence may be regarded as redundant when it is a subset of the other call sequences that have the same support as the call sequence.

In some embodiments, the BIDE may be applied to each cluster of the first clusters 204, and frequent closed sequences may be produced for the cluster. For example, suppose that the three sequences in a cluster are ab, abc, and abd. If the min_sup is 2, then BIDE produces frequent closed sequences ab. While other frequent sequence miners such as Bitmap (i.e., a sequence mining algorithm used in MAPO) return a, b, and ab. Clearly, since ab is frequent, a and b are also frequent and need not be listed. BIDE returns only the longest sequences if there are subsequences with the same support.

After generating FCS sets 206, the miner 114 may merge the frequent closed sequences to generate the consolidated FCS set 208 at 506. Here, while sequences that are not similar are divided into different clusters, the frequent closed sequences mined from different clusters may be similar, causing redundancy among the resultant patterns.

At 508, the miner 114 may cluster the consolidated FCS set 208 and generate multiple clusters corresponding to API usage patterns. To consolidate the frequent closed patterns mined from different clusters, a second clustering may be performed to generate multiple clusters. Each resultant cluster may represent an API usage pattern associated with the API method.

For example, suppose that the frequent closed sequence abc and ab are mined from different clusters. After clustering, these two sequences are grouped together as one pattern, which is shown as abc. With this technique, the number of redundant sequences in the mined API usage patterns may be reduced. In the second clustering, the complete-linkage clustering technique with a threshold β may be used, which is discussed in a greater detail in Illustrative Determination of the Optimal Coefficients below.

Illustrative Probabilistic Graphs

Figure 6:
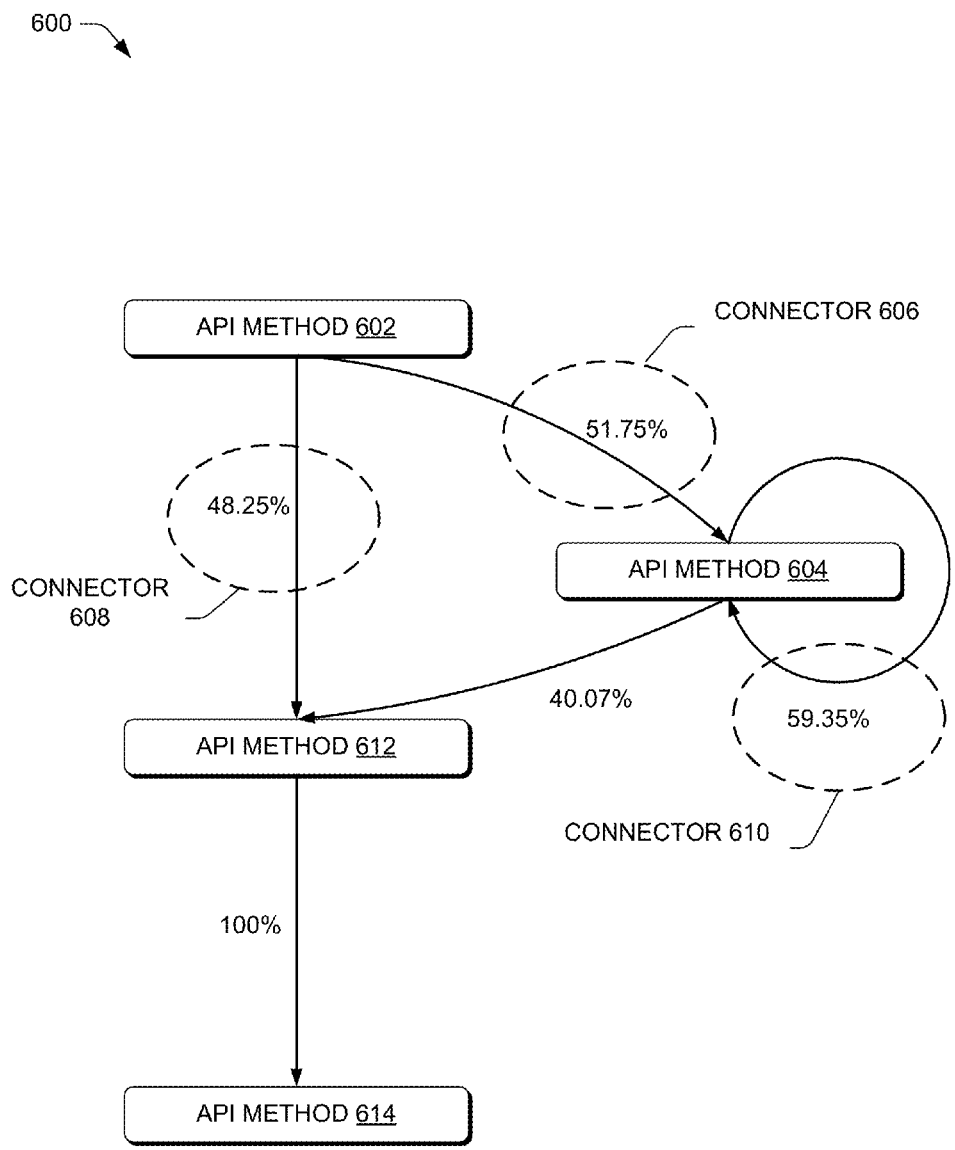
FIG. 6 illustrates an example graphical representation of an API usage pattern.

FIG. 6 illustrates an example graphical representation 600 of an API usage pattern. The graphical representation 600 may include multiple API methods and multiple connectors that connect the multiple API methods. Individual connector of the multiple connectors may start from one API method A and end at another API method B, indicating that the API method A is called after the API method B. In some embodiments, some other API methods are called between the calling of A and B since non-continuous subsequences may be mined as frequent closed sequences. The connector may also include a parameter indicating a probability that the one API method is called right after the other API method among all call sequences that contain this API usage pattern. The probabilities in the graph may help the user 102 explore which branch is used more frequently than the others. In some embodiments, the connector may start from and end at the same API method, indicating that the API method is called at the second time after being called previously.

In the illustrated embodiments, an API method 602 and an API method 604 may be connected by a connector 606. The connector 606 may include a directed line (i.e., a line with an arrowhead) and a parameter (i.e., 51.75%). The connector 606 may indicate that the API method 604 may be called right after the API method 602 and the corresponding probability is 51.75%. In addition, a connector 608 may indicate another call sequence associated with API method 602. Specifically, the API method 612 may be called after the API method 602 and the corresponding probability is 42.25%.

Similarly, a connector 610 may indicate that the API method 604 may be called after being called previously and the corresponding probability is 59.35%. And, the API method 612 may be called after the API method 604 is called and the corresponding probability is 40.07%. Further, the illustrated amendment may also show that an API method 614 is always called after the API method 612 in this API usage pattern since the corresponding probability is 100%.

FIG. 7 illustrates an example algorithm 700 for generating a graphical representation. The algorithm 700 and another algorithm 800 described below may be implemented to compute some metric for influence of certain users. The algorithms 700 and 800 are used to present various illustrative implementations of features that are discussed above. The following discussion refers to the illustrative algorithms 700 and 800 by line numbers 702 and 802 shown in the left hand side of the algorithm. The discussion provides various features that may be implemented in any order, function, or variation of modules to perform the various functions described more generally above. Therefore, the techniques discussed above are not limited by the implementation of the illustrative algorithms 700 and 800.

The algorithm 700 may generate a graph with probabilities on edges of the graph based on frequent closed call sequences in individual cluster of the second clusters 210. The algorithm 700 may perform two iterations to compute the probabilities of one method call following the other one. In some embodiments, the algorithm 700 may add an "End" node to a set of nodes, which are all the distinctive method calls in the cluster, to differentiate among a method call following another method call in a sequence, a method call following the method call itself in the sequence, and a method call being the last call in the sequence. In some embodiments, the algorithm 700 may present different API usages as different patterns, and one graph may include one or more patterns.

In the illustrated embodiment, the algorithm 700 may include lines 1-4, which may input a set of frequent closed patterns (i.e., API method sequences) that are in a cluster of the second clusters 201 and output an API method call graph with associated probability of a calling relationship. In lines 5-25, the algorithm 700 may implement two steps to build the graph. The algorithm 700 may first collect set of distinct API methods in all patterns (i.e., method_call_set). And then, the algorithm 700 may calculate a probability P (i.e., m1→m2| m1→all) of invoking API method m2 given all possible invoked API methods after invoking API method m1 (i.e., probability_matrix).

Illustrative Determination of the Optimal Coefficients

In this disclosure, a two-step clustering process may be implemented to identify less common API usages whose frequency in a call sequence set does not satisfy the minimum support. In some embodiments, the two-step clustering process may involve two coefficients a (i.e., a threshold for clustering the API method call sequences 202) and b (i.e., a threshold for clustering the consolidated FCS 208). In these instances values of the two coefficients may vary independently. Different combinations of a and b may result in different clustering performances and different numbers of patterns, thus affecting quality of mined usage patterns.

In some embodiments, the optimal threshold values may be determined automatically. The optimal threshold values may be implemented to maximize both the coverage and succinctness of mined API usage patterns. Measuring the number of resultant patterns may reflect the succinctness of the mined API usage patterns. To cover API usage using a minimal number of the mined API usage patterns, the mined patterns are as dissimilar as possible from one another. To measure to what extent the mined API usage patterns are dissimilar to each other, an overall dissimilarity metric D (i.e., dissimilarity of resultant pattern graphs) may be defined.

The metric D is defined as an average dissimilarity between the graphical representations of the two usage patterns using Equation (2) below.

$$D = \frac{\sum_{i=0}^{n-1} \sum_{j=i+1}^{n} (1 - E_i \cap E_j / E_i \cup E_j)}{n*(n-1)/2} \quad (2)$$

wherein $E_i$ and $E_j$ are the set of edges in two graphs, and $(1-E_i \cap E_j/E_i \cup E_j)$ represents the graph dissimilarity between two graphs, considering the common edges between the two graphs. A selection of the two clustering thresholds may produce patterns that maximize dissimilarities among identified patterns and also minimize the number of resultant patterns. Accordingly, the following utility function U may be defined as U=D/n.

FIG. 8 illustrates an example algorithm 800 for determining optimal threshold values. The algorithm 800 may include lines 1-7, which input minimum and maximum thresholds for pre-BIDE and post-BIDE clusterings and output optima threshold values for these clusterings. The algorithm 800 may also include lines 9 and 10, which may set a threshold a (i.e., the pre-BIDE clustering threshold) to a maximum value $a_{max}$ and the threshold b (i.e., the post-BIDE clustering threshold) to $b_{max}$. In lines 11-25, the algorithm may calculate a utility function for each pair of clustering thresholds, and adjust the threshold values by decreasing its value by a step S, to search for the maximum utility value, until their values reach $a_{min}$ or $b_{min}$. In line 26, the algorithm 800 may return the optimal threshold values, $m_a$ and $m_b$, that lead to the maximum utility value. In some embodiments, the algorithm may set $a_{max}=b_{max}=1.00$, $a_{min}=b_{min}=0.00$, and S=0.001 respectively.

Illustrative Interface

Figure 9:
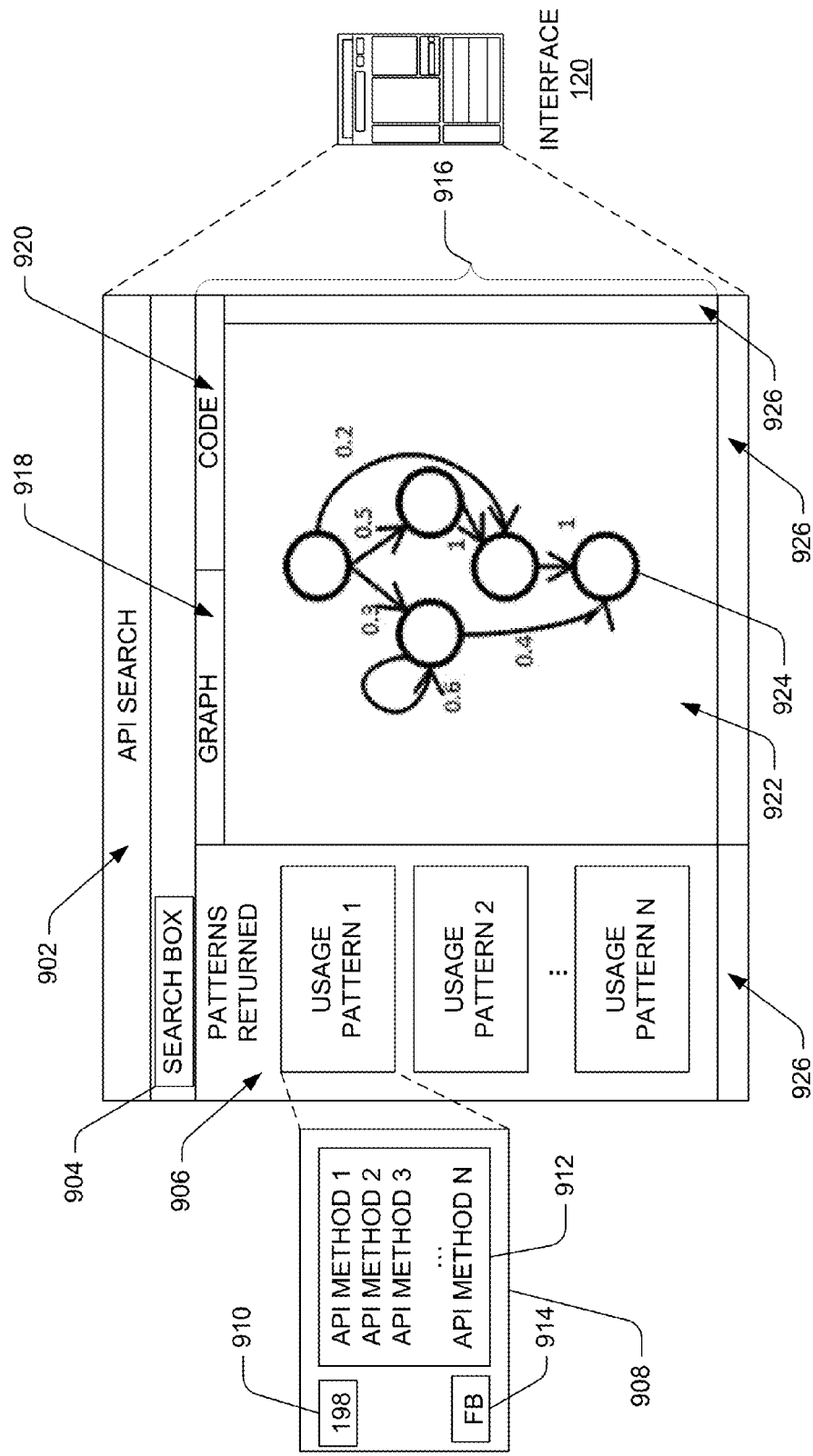
FIG. 9 illustrates an example interface that enables searching API usage patterns.

FIG. 9 illustrates an example interface 120 that enables searching API usage patterns. While FIG. 9 illustrates an example user interface, multiple other graphical or non-graphical user interfaces may be employed to enable searching API usage patterns without departing from the scope of the present disclosure.

In the illustrated embodiment, the interface 120 may include a title section 902, a search box 904 and a patterns returned section 906. The user 102 may input the full or partial name of an API method in the search box 904, and the processing engine 106 may acquire the information. The processing engine 106 may return API usage patterns that are listed in the patterns returned section 906. The pattern returned section 906 may include one or more usage pattern sub-sections 908 (e.g., usage pattern 1, usage pattern 2, . . . usage pattern N).

The usage pattern sub-sections 908 may include a number 910 indicating a popularity of an API usage pattern (e.g., the usage pattern 1) in the code 124. The popularity may indicate occurrences of an individual API usage pattern in the code 124. In some embodiments, based on the popularities, usage pattern 1, usage pattern 2, . . . usage pattern N may be ranked in the patterns returned section 906. The usage pattern sub-section 910 may also include an API method list 912 including API methods of the API usage pattern (e.g., the usage pattern 1). In some embodiments, the usage pattern sub-section 910 may include a feedback selection 914. The user 102 may click the feedback selection 914 to provide feedback (e.g., like or dislike) regarding search results.

The interface 120 may also include a resultant pattern section 916. The resultant pattern section 916 may further include a graph selection 918, a code section 920, and a graph section 922. In some embodiments, if the user 102 clicks the graph selection 918, the interface 120 may surface, in the graph section 922, a graph 924 (e.g., the graphical representation 600) derived from the API usage pattern (e.g., the usage pattern 1). In other embodiments, if the user clicks the code section 920, the interface 120 may surface, in the resultant pattern section 916, code snippets associated with the API usage pattern. The interface 120 may also include scrollbars 926 that enable the user 102 to read the search results.

Illustrative Computing Device

Figure 10:
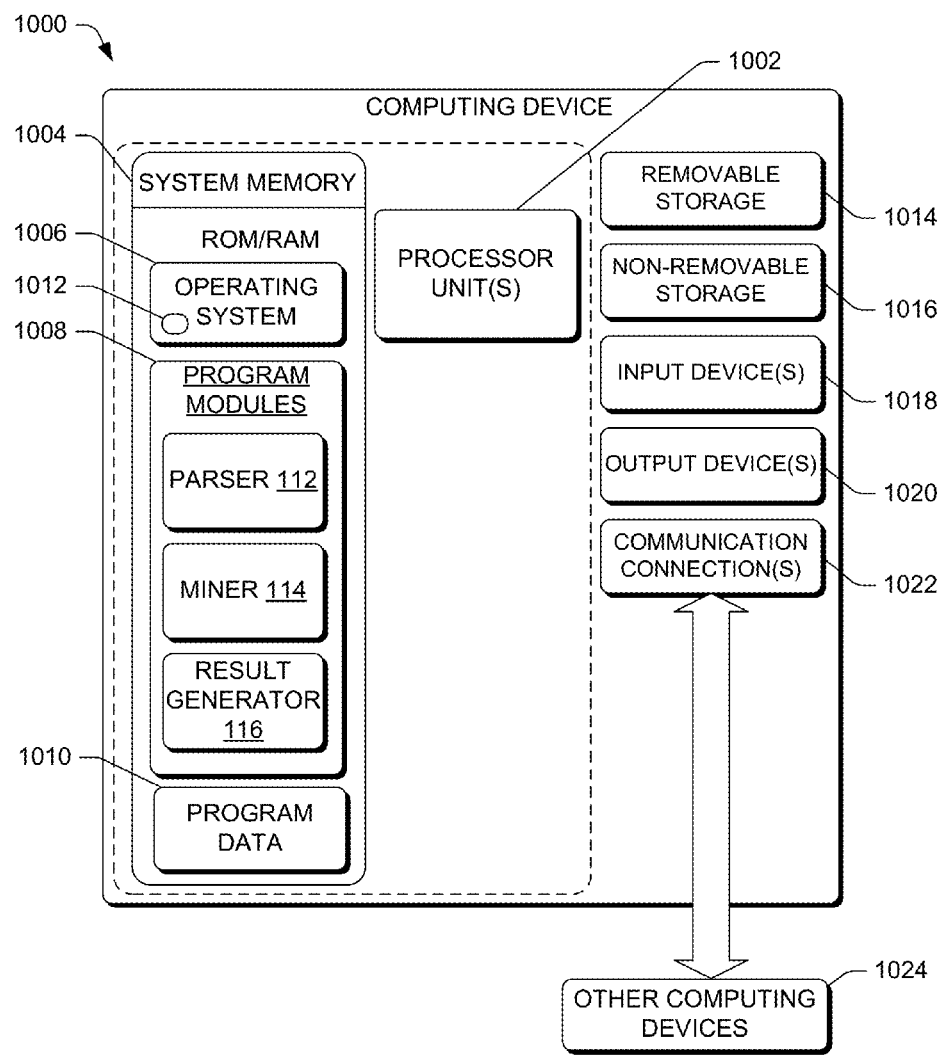
FIG. 10 illustrates an example computing device that may be deployed in various embodiments, such as in the architecture shown in FIG. 1 and/or in the scheme shown in FIG. 2.

FIG. 10 shows an illustrative computing device 1000 that may be used to implement the speech recognition system, as described herein. The various embodiments described above may be implemented in other computing devices, systems, and environments. The computing device 1000 shown in FIG. 10 is only one example of a computing device and is not intended to suggest any limitation as to the scope of use or functionality of the computer and network architectures. The computing device 1000 is not intended to be interpreted as having any dependency or requirement relating to any one or combination of components illustrated in the example computing device.

Alternatively, or in addition, the functionally described herein may be performed, at least in part, by one or more hardware logic components. For example, and without limitation, illustrative types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In a very basic configuration, the computing device 1000 typically includes at least one processing unit 1002 and system memory 1004. Depending on the exact configuration and type of computing device, the system memory 1004 may be volatile (such as RAM), non-volatile (such as ROM, flash memory, etc.) or some combination of the two. The system memory 1004 typically includes an operating system 1006, one or more program modules 1008, and may include program data 1010. For example, the program modules 1008 may includes the parser 112, the miner 114 and result generator 116, as discussed in the architecture 100, the scheme 200 and/or the illustrative processes 300-500.

The operating system 1006 includes a component-based framework 1012 that supports components (including properties and events), objects, inheritance, polymorphism, reflection, and the operating system 1006 may provide an object-oriented component-based application programming interface (API). Again, a terminal may have fewer components but will interact with a computing device that may have such a basic configuration.

The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by removable storage 1014 and non-removable storage 1016. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 1004, the removable storage 1014 and the non-removable storage 1016 are all examples of computer storage media. Computer storage media includes RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 1000. Any such computer storage media may be part of the computing device 1000. Moreover, the computer-readable media may include computer-executable instructions that, when executed by the processor unit(s) 1002, cause the computing device 1000 to perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 1000 may also have input device(s) 1018 such as keyboard, mouse, pen, voice input device, touch input device, etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Output device(s) 1020 such as a display, speakers, printer, etc. may also be included. These devices are well known in the art and are not discussed at length here.

The computing device 1000 may also contain communication connections 1022 that allow the device to communicate with other computing devices 1024, such as over a network. These networks may include wired networks as well as wireless networks. The communication connections 1022 are one example of communication media.

It is appreciated that the illustrated computing device 1000 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 1000 may be implemented in a cloud computing environment, such that resources and/or services are made available via a computer network for selective use by mobile devices.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A computer-implemented method for Application Programming Interface (API) method usage data mining, the method comprising:
   generating API call sequences associated with an API method from a code file;
   clustering the API call sequences to generate multiple clusters;
   determining multiple frequent closed sequences of the multiple clusters; and
   clustering the multiple frequent closed sequences to generate an API usage pattern associated with the API method.

2. The computer-implemented method of claim 1, wherein the clustering the API call sequences comprises clustering the API call sequences based on similarities among the API call sequences.

3. The computer-implemented method of claim 1, wherein the clustering the API call sequences comprises clustering the API call sequences using an n-gram algorithm.

4. The computer-implemented method of claim 1, wherein the determining the multiple frequent closed sequences comprises:
   determining multiple frequent closed sequences of individual clusters of the multiple clusters, and
   merging the frequent closed sequences of the individual clusters to obtain the multiple frequent closed sequences of the multiple clusters.

5. The computer-implemented method of claim 4, wherein the multiple frequent closed sequences of the individual clusters is determined by implementing a BI-Directional-Extension-based frequent closed sequence mining (BIDE) algorithm to the individual cluster.

6. The computer-implemented method of claim 1, wherein the clustering the multiple frequent closed sequences to generate the API usage pattern associated with the API method comprising clustering the multiple frequent closed sequences to generate multiple API usage patterns associated with the API method.

7. The computer-implemented method of claim 6, further comprising:
   selecting a coefficient for the clustering the API call sequences and
   selecting an additional coefficient for the clustering the multiple frequent closed sequences.

8. The computer-implemented method of claim 7, wherein the coefficient and the additional coefficient are selected such as to:
   increase dissimilarities among the multiple API usage patterns, and
   decrease a number of the multiple API usage patterns.

9. The computer-implemented method of claim 1, wherein the API method is a first API method, and wherein the method further comprises generating a probabilistic graph of the API usage pattern, the probabilistic graph including:
 a directed line that connects a second API method and a third API method that are included in the API usage pattern, and
 a probability indicator associated with the directed line.

10. The computer-implemented method of claim 9, wherein the directed line indicates that the second API method is called after the third API method, and the probability indicator indicates a probability that the second API method is called after the third API method.

11. The computer-implemented method of claim 1, further comprising:
 receiving a query for usage of the API method; and
 returning a result including a probabilistic graph and a code snippet that are associated with the API usage pattern.

12. One or more computer storage media storing computer-executable instructions that are executable by one or more processors to cause the one or more processors to perform acts comprising:
 receiving a query for usage of an API method;
 generating API call sequences based on a codebase, individual API call sequences of the API call sequences including the API method; and
 mining the API call sequences to generate an API usage pattern for the API method using a frequent closed sequence mining algorithm, wherein the mining the API call sequences to generate the API usage pattern for the API method comprises:
  clustering the API call sequences to generate first multiple clusters based on similarities among the API call sequences,
  identifying multiple frequent closed sequences of the first multiple clusters, and
  clustering the multiple frequent closed sequences to generate the API usage pattern for the API method.

13. The one or more computer storage media of claim 12, wherein the acts further comprise returning a probabilistic graphical representation indicating the API usage pattern.

14. The one or more computer storage media of claim 12, wherein mining the API call sequences to generate the API usage pattern for the API method further comprises:
 selecting a coefficient for the clustering the API call sequences to generate first multiple clusters; and
 selecting an additional coefficient for the clustering the multiple frequent closed sequences.

15. The one or more computer storage media of claim 14, wherein the coefficient and the additional coefficient are selected such as to:
 increase dissimilarities among the multiple API usage patterns, and
 reduce a number of the multiple API usage patterns.

16. A system for API method usage data mining, the system comprising:
 one or more processors; and
 memory to maintain a plurality of components executable by the one or more processors, the plurality of components comprising:
  a parser configured to collect API call sequences of an API method from a codebase, and
  a miner configured to:
   generate first multiple clusters by clustering the API call sequences,
   determine multiple frequent closed sequences of the first multiple clusters, and
   generate second multiple clusters by clustering the multiple frequent closed sequences, individual clusters of the second multiple clusters corresponding to an API usage pattern for the API method.

17. The system of claim 16, wherein the plurality of components further comprise:
 an interface configured to receive a query for usage of the API method and a result including the API usage pattern, and
 a result generator configured to generate a probability graph of the API usage pattern.

18. The system of claim 16, wherein the determining the multiple frequent closed sequences of the first multiple clusters comprises:
 determining multiple frequent closed sequences of individual cluster of the first multiple clusters by implementing a frequent closed sequence mining algorithm to the individual cluster, and
 merging the multiple frequent closed sequences of individual cluster to obtain the multiple frequent closed sequences of the first multiple clusters.

19. The system of claim 16, wherein the first multiple clusters are generated using a first coefficient, the second multiple clusters are generated using a second coefficient, and the first coefficient and the second coefficient are selected such as to:
 increase dissimilarities among the second multiple clusters, and
 decrease a number of the second multiple clusters.

20. The one or more computer storage media of claim 12, wherein the clustering the API call sequences comprises clustering the API call sequences based on similarities among the API call sequences.

* * * * *